(12) United States Patent
Kawasaki

(10) Patent No.: US 8,948,724 B2
(45) Date of Patent: Feb. 3, 2015

(54) COMMUNICATION TERMINAL OFFERING PRIVACY PROTECTION FOR HANDS-FREE FUNCTIONALITY USING AN ANALYSIS PROCESS

(75) Inventor: Haruo Kawasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1042 days.

(21) Appl. No.: 11/883,180

(22) PCT Filed: Jan. 31, 2006

(86) PCT No.: PCT/JP2006/301919
§ 371 (c)(1),
(2), (4) Date: Jul. 27, 2007

(87) PCT Pub. No.: WO2006/080575
PCT Pub. Date: Aug. 3, 2006

(65) Prior Publication Data
US 2008/0139178 A1   Jun. 12, 2008

(30) Foreign Application Priority Data

Jan. 31, 2005   (JP) .................................. 2005-022647

(51) Int. Cl.
*H04M 1/66*   (2006.01)
*H04M 1/725*   (2006.01)
*H04L 12/58*   (2006.01)
*H04M 1/60*   (2006.01)
*H04W 4/12*   (2009.01)
*H04W 88/02*   (2009.01)

(52) U.S. Cl.
CPC ......... *H04M 1/72552* (2013.01); *H04L 12/585* (2013.01); *H04L 51/12* (2013.01); *H04M 1/6075* (2013.01); *H04L 12/5895* (2013.01); *H04M 1/66* (2013.01); *H04M 2250/02* (2013.01); *H04W 4/12* (2013.01); *H04W 88/02* (2013.01)
USPC ..................... 455/411; 455/569.1; 455/569.2; 455/412.2; 379/67.1; 379/419

(58) Field of Classification Search
CPC ... H04M 1/6075; H04M 1/0258; H04M 1/05; H04M 1/19; H04M 1/6058; H04M 1/7253; H04M 2203/4536; H04M 2250/02
USPC ................ 455/411, 413, 556.1, 569.1, 569.2, 455/412.2; 379/88.02, 88.12, 88.16; 704/260, 270
See application file for complete search history.

(56) References Cited

U.S. PATENT DOCUMENTS

| 6,711,239 | B1 * | 3/2004 | Borland | 379/67.1 |
| 6,928,307 | B2 | 8/2005 | Ohtsuki | |
| 7,039,393 | B1 * | 5/2006 | Kite | 455/412.2 |
| 7,177,670 | B2 * | 2/2007 | Yoon | 455/569.1 |

(Continued)

FOREIGN PATENT DOCUMENTS

| CN | 1532763 A | 9/2004 |
| EP | 0948160 A2 | 10/1999 |

(Continued)

*Primary Examiner* — Gerald Johnson
(74) *Attorney, Agent, or Firm* — Foley & Lardner LLP

(57) ABSTRACT

According to an exemplary embodiment of the invention, when a mail is received, the mail content is analyzed by a message analysis circuit performing analysis according to a keyword set in advance and read operation of the mail of the hands-free function is controlled, thereby enabling privacy protection in the vicinity of a mobile telephone or from passengers of a vehicle.

21 Claims, 5 Drawing Sheets

(56) References Cited

U.S. PATENT DOCUMENTS

| | | | |
|---|---|---|---|
| 7,551,916 B2* | 6/2009 | Gortz et al. | 455/412.2 |
| 7,590,411 B2 | 9/2009 | Yamane et al. | |
| 7,650,170 B2* | 1/2010 | May et al. | 455/569.2 |
| 2003/0130016 A1* | 7/2003 | Matsuura et al. | 455/569 |
| 2003/0190909 A1 | 10/2003 | Matsushita | |
| 2004/0001588 A1* | 1/2004 | Hairston | 379/419 |
| 2004/0260555 A1 | 12/2004 | Nishii | |

FOREIGN PATENT DOCUMENTS

| | | |
|---|---|---|
| JP | 61-157053 A | 7/1986 |
| JP | 4-349747 | 12/1992 |
| JP | 7-107153 | 4/1995 |
| JP | 10-203257 | 8/1998 |
| JP | 11-308166 A | 11/1999 |
| JP | 2000-134253 A | 5/2000 |
| JP | 2001-331419 A | 11/2001 |
| JP | 2002-48572 A | 2/2002 |
| JP | 2002-176486 A | 6/2002 |
| JP | 2003-046635 A | 2/2003 |
| JP | 2003-208189 A | 7/2003 |
| JP | 2003-218999 A | 7/2003 |
| JP | 2003-296248 A | 10/2003 |
| JP | 2004-140731 A | 5/2004 |
| JP | 2004-147037 A | 5/2004 |
| JP | 2004-208031 A | 7/2004 |
| JP | 2004-236346 A | 8/2004 |
| JP | 2005-011003 A | 1/2005 |
| WO | WO 99/49681 A1 | 9/1999 |

* cited by examiner

COMMUNICATION TERMINAL OFFERING PRIVACY PROTECTION FOR HANDS-FREE FUNCTIONALITY USING AN ANALYSIS PROCESS

TECHNICAL FIELD

This invention relates to a portable-type communication terminal and, in particular, relates to privacy protection in a mail reading-out function and a hands-free speech function. In this description, a mail represents an electronic mail.

BACKGROUND ART

Radio communication terminals such as portable telephones and PHSs include those having a mail receiving function. Such terminals include those having a function of notifying a communication terminal user of mail arrival using a ringtone, like in the case of call arrival, upon mail reception, a function of reading out a mail, and a hands-free speech function.

In the case of hands-free setting, a series of operations of these functions can be automatically associated with each other. For example, notification is made using an arrival sound when a mail is received and, further, it is possible to automatically read out the mail using a hands-free speech function of a portable telephone itself or an external hands-free speech device.

However, if the hands-free speech function is not of the headphone type or the like that allows only a user of a portable telephone to hear a sound, but is the type that outputs a sound at a large volume from a loudspeaker of an external device or the portable telephone itself, the sound leaks out so that not only the user of the portable telephone but also others around the user, for example, car passengers or the like, can hear the sound, and thus privacy or secret protection cannot be effectively achieved.

With respect to such a problem, Japanese Unexamined Patent Application Publication (JP-A) No. 2003-046635 describes an invention that controls display of a caller and hands-free speech/nonspeech based on advance settings, a sender telephone number of a received call, and the state in a car. Further, Japanese Unexamined Patent Application Publication (JP-A) No. 2004-140731 describes an invention wherein the hands-free function is automatically operated upon detection of the presence/absence of a passenger and that a terminal has been registered in advance, thereby implementing privacy control. Further, Japanese Unexamined Patent Application Publication (JP-A) No. 2004-147037 describes an invention that controls the hands-free operation according to the presence/absence of a passenger and identification information of a call sender. Further, Japanese Unexamined Patent Application Publication (JP-A) No. Hei 10-203257 describes an invention that achieves privacy protection by detecting the presence/absence of a passenger and displaying identification information of a call sender at a position recognizable only by a driver upon call arrival.

However, the foregoing conventional privacy protection functions assume a voice call and are not adapted for a mail. Further, whether or not the hands-free is usable is judged based on the results of detecting a call sender telephone number and the presence/absence of a passenger, and so on. Consequently, there is a problem that it is not possible to implement flexible control of hands-free function according to characteristics unique to a mail and the content of a message.

Therefore, in consideration of such a problem, it is an object of this invention to provide a device that analyzes the content of a message, upon message reception, using a message analysis circuit adapted to perform an analysis according to a keyword set in advance and judges as to whether or not a hands-free function is usable, thereby enabling privacy protection in the vicinity of a portable telephone or from a passenger during car driving.

DISCLOSURE OF THE INVENTION

For accomplishing the foregoing object, an information terminal according to an exemplary aspect of this invention is an information terminal having a message communication function of communicating a message and a hands-free function of outputting, in the form of a voice signal, a received message received by the message communication function and comprising an analysis information list storage circuit (hereinafter referred to as an analysis information list) for storing one or more analysis information for use in analyzing the received message, a message analysis circuit for performing an analysis of the received message according to the analysis information stored in the analysis information list, and a hands-free function control circuit for controlling operation and stop of the hands-free function depending on a result of the message analysis by the message analysis circuit.

An information terminal according to another exemplary aspect of this invention is an information terminal having a mail communication function of communicating a mail and a hands-free function of outputting, in the form of a voice signal, a received mail received by the mail communication function and comprising an analysis information list for storing one or more character string analysis information comprising one or more characters for use in analyzing the received mail, a mail analysis circuit for performing an analysis of the received mail according to the character string analysis information stored in the analysis information list, and a hands-free function control circuit for controlling operation and stop of the hands-free function depending on a result of the mail analysis by the mail analysis circuit.

An information terminal according to still another exemplary aspect of this invention is an information terminal having a voice message communication function of communicating a voice message and a hands-free function of outputting, in the form of a voice signal, a voice message received by the voice message communication function and comprising an analysis information list for storing one or more character string analysis information comprising one or more characters for use in analyzing the received voice message, a voice recognition circuit for converting the voice message into character language information, and a message analysis circuit for analyzing whether or not a character string of the character string analysis information is included in the received voice message converted into the character language information by the voice recognition circuit.

An information terminal according to still another exemplary aspect of this invention is an information terminal having a voice message communication function of communicating a voice message and a hands-free function of outputting, in the form of a voice signal, a voice message received by the voice message communication function and comprising an analysis information list for storing one or more voice signal pattern analysis information comprising voice signal pattern information including feature information of a voice signal, a voice analysis circuit for extracting a feature of a voice signal and outputting voice signal pattern information, and a message analysis circuit for comparing between the voice signal pattern information of the analysis information list and the voice signal pattern information of the voice message.

BEST MODE FOR CARRYING OUT THE INVENTION

Figure 1:
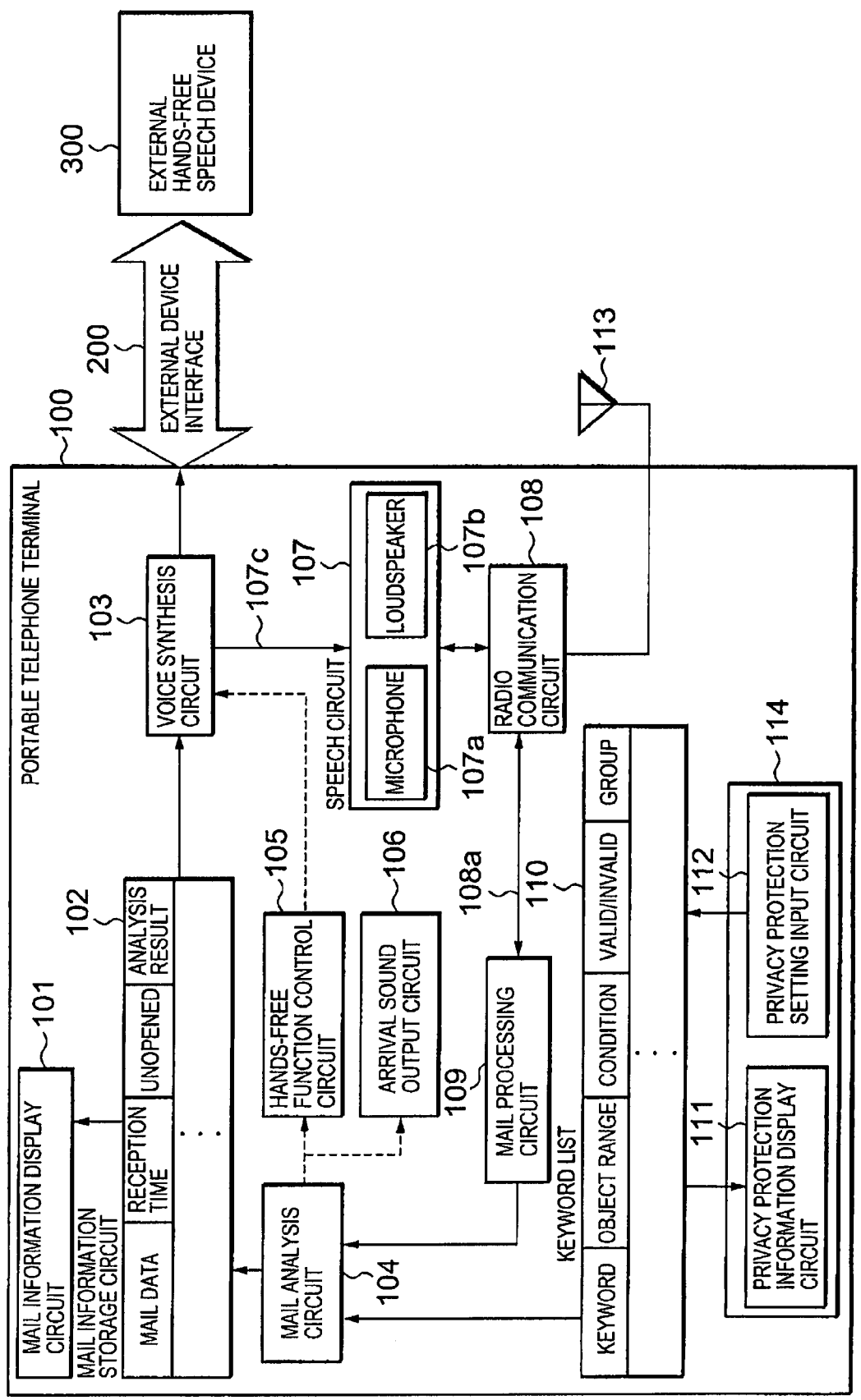
FIG. 1 is a structural diagram in a first exemplary embodiment of this invention.

Hereinbelow, a first exemplary embodiments of this invention will be described in detail with reference to the drawings. FIG. 1 is a functional block diagram showing the exemplary embodiment of this invention. This exemplary embodiment shows the case where a privacy protection device is mounted as part of functions of a portable telephone terminal 100. This invention is applicable not only to a portable telephone terminal, but also to an information processing device such as a portable information terminal capable of receiving a message and having a hands-free function by itself or adapted for a hands-free function by connecting an external device thereto.

The portable telephone terminal 100 comprises, like a normal portable telephone terminal having a mail function, a radio circuit 108, a mail processing circuit 109, a speech circuit 107, a microphone 107a and a loudspeaker 107b included in the speech circuit, an arrival sound output circuit 106 for notifying arrival of a voice call or a mail, a voice synthesis circuit 103 for a mail reading-out function, a hands-free function control circuit 105 for controlling the voice synthesis circuit 103 to thereby control a hands-free function, a mail information storage circuit 102 for storing a received mail along with a mail reception time and other information, a mail information display circuit 101 for displaying mail information stored in the mail information storage circuit 102, a keyword list 110 serving as an analysis information list, an antenna 113, and a mail analysis circuit 104.

The information stored in the mail information storage circuit 102 includes, in addition to the mail reception time, text data of the mail body, text data of a mail header such as a sender and a title, mail opened/unopened information indicating whether or not the mail is opened, mail analysis results, and so on.

Herein, the mail opened/unopened information is set to an opened state of a mail after the mail is read out by the mail reading-out function, and is set to an unopened state when the mail is prevented from being read out by a privacy protection function and is resultantly not read out. It may also be normal mail opened/unopened state information which is set to an opened state of a mail after the mail body is once displayed by a mail display function, and is set to an unopened state when the mail body is not displayed at all. These information is displayed along with the information of the mail when a user of the information terminal calls out the information of the mail and displays it on a non-illustrated display device using the mail information display circuit 101.

The portable telephone terminal 100 further comprises a privacy protection operation section 114 that controls a user interface adapted to operate the privacy protection function, and a privacy protection information input circuit 112 for carrying out setting of the keyword list 110 and a privacy protection information display circuit 111 for displaying information of the keyword list 110, which are included in the privacy protection function operation section 114.

Herein, the mail information display circuit 101 and the privacy protection operation section 114 represent particular partial functions of a user interface of the portable telephone terminal 100 and may be integrated with a non-illustrated user interface function of the portable telephone terminal 100.

One or more sets of analysis information for use in analyzing a received mail are stored in the keyword list 110, wherein each set of analysis information includes a keyword in the form of a character string of one or more characters and attribute information set for the set keyword.

A keyword may be, for example, a noun such as a company's name or a person's name, a word other than that, a sentence longer with more characters, or the like. A plurality of keywords may be specified along with designation of a logical condition as will be described later.

Attribute information of a keyword includes analysis range information for designating a specific range of mail data as a mail analysis object, a logical condition for the keyword, valid/invalid information as to whether or not an analysis of the set keyword is valid, group information indicating a group the set keyword is included in, and so on.

Among the attribute information, the analysis range information, specifically, designates as an analysis object one or more specific portions of the mail body or a mail header portion such as a title and a sender, thereby serving as information for limiting the analysis object range.

Among the attribute information, the logical condition represents information that designates, in terms of logical operations, an analysis condition for analysis information when the mail analysis circuit 104 analyzes mail data using the analysis information. For example, the logical condition may be a NOT condition where it is true, judging that the condition is established, when any keywords are not included in an analysis range designated by analysis range information, an AND condition where, conversely, it is true when all keywords are included in an analysis range, an OR condition where it is true when any of designated keywords is included in an analysis range, or the like.

By designating a plurality of keywords, a logical condition, and an analysis range in analysis information, the user of the portable telephone terminal 100 can set a higher-level more flexible judgment as to where or not the hands-free function is usable. For example, it is possible to flexibly and simply perform setting of securely judging mails from a sender using a plurality of mail addresses. This flexibility does not merely make it possible to perform setting by designating a plurality of sender or destination addresses on the assumption of a plurality of mail addresses. For example, in mails, To:, From:, a word such as "Mr., Esq." like in general correspondence, words giving a name of a character sender himself, and words including a destination or addressee are often given at the beginning or end of the body. If keywords and attribute conditions of this invention are set aiming at such words, privacy protection can be set for all mails considered to be related to specific persons or companies by detecting names of the specific persons or companies included in messages.

Among the attribute information, the group information facilitates using a plurality of set keywords in combination thereof. For example, a group name is set to a client A, a client B, a family, or the like and one or more keywords are registered in the group. After setting the group and the keywords belonging to the group, the keywords registered in the group can be collectively designated and subjected to setting of valid/invalid and so on only by designating the group name.

The message analysis circuit 104 analyzes mail data of a received mail according to attribute information set in all analysis information set valid or in all analysis information set valid in terms of a group in the keyword list and outputs analysis results. Whether or not the hands-free control is necessary is judged based on the analysis results.

The message analysis circuit 104 may be mounted so as to enable, as a special analysis, a special search process such as a regular expression.

An external hands-free speech device 300 shown in FIG. 1 is an external device for hands-free speech, separate from the portable telephone terminal. For example, this is an on-car hands-free speech device allowing a car driver to speak through a portable telephone during driving.

An external device interface 200 is an interface for connection between the external hands-free speech device 300 and the portable telephone terminal 100. This is the same as a general interface for use in connection between a portable telephone terminal and an external device and may be, for example, a digital interface by cable connection such as Universal Serial Bus (USB), an analog interface such as an audio output/input jack by cable connection, or another wireless interface such as an infrared interface or Bluetooth.

In this exemplary embodiment, the case where the hands-free function is used by using the loudspeaker 107b for speech provided in the portable telephone terminal 100 and the case where the hands-free function is used by separately connecting the external hands-free speech device 300 on the exterior through the external device interface can be selectively switched by the user of the portable telephone terminal 100 or automatically switched according to the state where the external device interface and the external hands-free speech device 300 are connected together.

Figure 2:
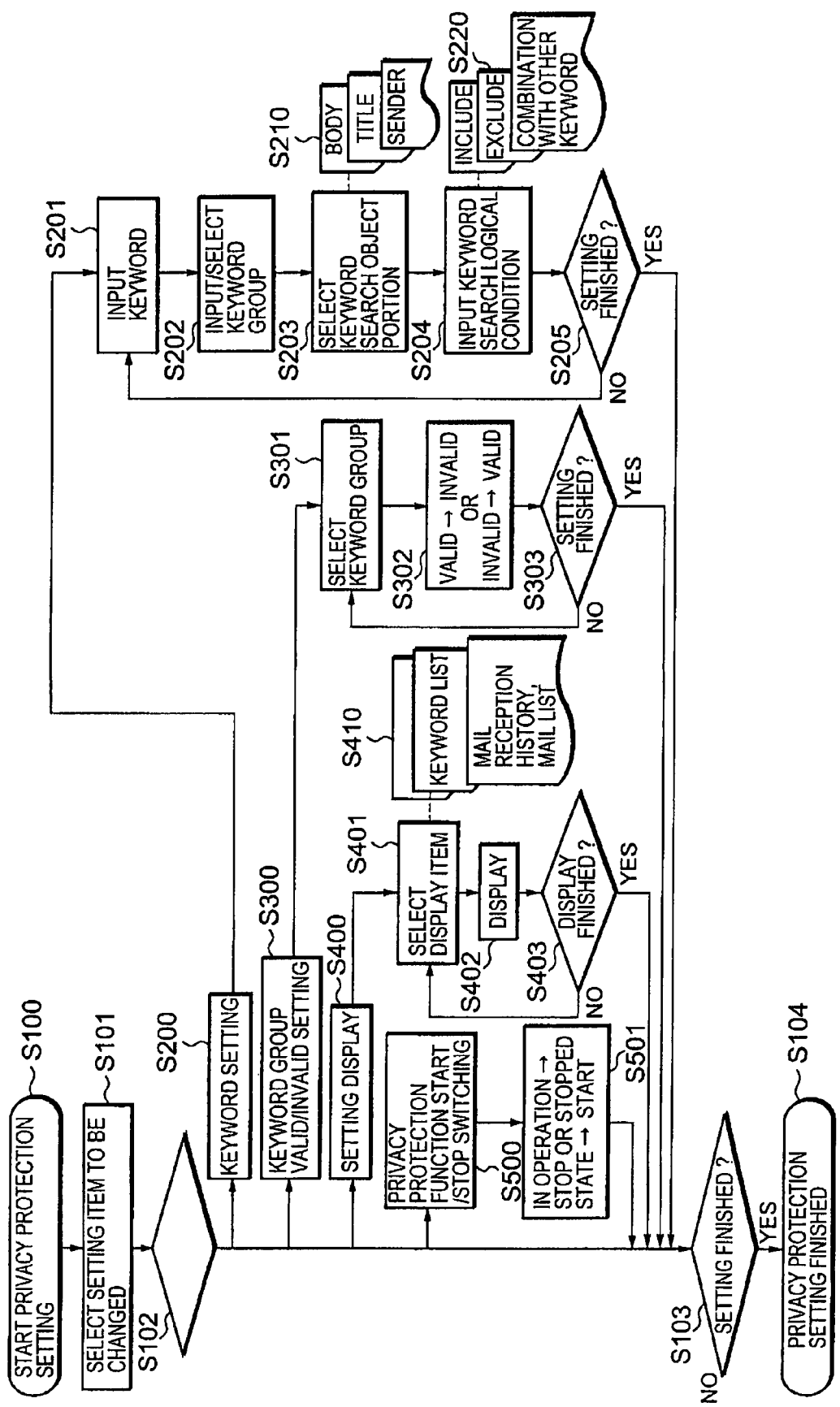
FIG. 2 is a flow diagram of a user interface in the exemplary embodiment of this invention.

Next, referring to FIG. 2, a description will be given of operations of setting and displaying an analysis information list and displaying a received mail. FIG. 2 shows the state where the processes of setting and displaying the analysis information list are implemented along privacy protection setting operations performed by the user of the portable telephone terminal 100 through the user interface of the portable telephone terminal 100. The portable telephone terminal user inputs a character string and performs a predetermined input operation using non-illustrated buttons and so on, thereby performing a selection of a menu and an input to an input dialog displayed on a non-illustrated operation screen of the user interface. The processes shown in FIG. 2 are related to the privacy protection information display circuit 111 and the privacy setting input circuit 112 included in the privacy protection function operation section 114 and further the mail information display circuit 101 shown in FIG. 1.

In FIG. 2, step S100 shows the state where the portable telephone terminal user has performed the operation of starting privacy protection setting using the non-illustrated user interface of the portable telephone terminal 100. In the process of step S102 subsequent to step S100, the processes of the mail information display circuit 101, the privacy information display circuit 111, and the privacy protection setting input circuit 112 branch to keyword setting, keyword group valid/invalid setting, setting display, and privacy protection function start/stop switching. This represents that the three circuits 101, 111, and 112 have four main processes.

A description will be given of the process of setting a keyword/keywords of analysis information. At first, in step S201, the portable terminal user inputs a character string/ strings of one or a plurality of keywords. This input and a series of information inputs in subsequent steps S202 to S220 are carried out through operations of the privacy protection information input circuit 114 by the portable terminal user. The keyword/keywords input in step 201 and the information input in subsequent steps 202 to S220 are stored as a series of analysis information in the keyword list 110.

In step S202, the portable terminal user designates a group the keyword/keywords input immediately before belongs/ belong to. Herein, a new group may be newly input for setting or, if the group has been set in the past, the set group may be called out and designated. If belonging to a specific group is not designated, this step may be skipped.

Then, in step S203, the portable terminal user designates an analysis range intended for by the keyword/keywords input immediately before. Herein, a plurality of ranges to be included as analysis objects may be designated like including the mail body and a title or a plurality of ranges to be excluded as analysis objects may be designated like excluding a sender and a destination. Then, in step S205, a logical condition such as an AND condition, an OR condition, or a NOT condition is input for the one or more keywords input in step S201.

The character string/strings of the keyword/keywords, the analysis range information, the logical condition, and the group information input by the portable terminal user in the processes of the foregoing steps S201 to S205 are stored as a set of analysis information in the keyword list 110 serving as an analysis information list. By repeatedly performing the series of operations of steps S201 to S205 by the portable terminal user, a plurality of sets of analysis information are stored in the keyword list 110.

A description will be given of the process of valid/invalid setting for a keyword group. The setting of valid/invalid is carried out through operations of the privacy protection information input circuit 114 by the portable terminal user like steps S201 to S220. At first, in step S301, the portable terminal user selects a group as a setting object. Then, in step S302, the portable terminal user switches setting from valid to invalid or, conversely, from invalid to valid. Herein, those keywords, for which belonging to a group was not explicitly designated at the time of the keyword setting, may be individually set valid/invalid or may be collectively set valid/ invalid as keywords with no group designation.

This valid/invalid information is stored as valid/invalid information of attribute information of analysis information in a corresponding analysis information area of the keyword list 110. If a group is set valid, information indicative of valid is stored in valid/invalid information of all analysis information designated to belong to this group, among analysis information stored in the keyword list 110. (hereinafter described as "validated") Likewise, if set invalid, information indicative of invalid is stored for all analysis information of the same group. (hereinafter described as "invalidated") All validated analysis information is used in an analysis process upon mail reception.

By this group information, the portable telephone terminal user can easily switch use/nonuse of a plurality of keywords according to an occasional state. This also applies to valid/ invalid setting for keywords with no group designation. Herein, apart from valid/invalid setting about hands-free function control, valid/invalid setting about arrival sound control may also be separately carried out.

Next, a setting display function will be described. The setting display function is implemented such that the privacy protection information display circuit 111 reads and displays the information stored in the keyword list 110 through the processes of steps S201 to S220 or steps S301 to S303.

The portable telephone terminal user selects information to be displayed in step S401 and the selected information is displayed in step S402. In this exemplary embodiment, the privacy information display circuit 111 reads information held in the keyword list 110 and displays it on a non-illustrated display circuit or the mail information display circuit 101 displays information held in the mail information storage circuit 102 on a non-illustrated display circuit.

In the case of displaying the keyword list, the privacy protection information display circuit 111 reads a plurality of analysis information stored in the keyword list 110 and displays keywords and attribute information as a list on the non-illustrated operation screen.

In the case of displaying the mail information, the mail information display circuit 101 displays, as a list, mail information stored in the mail information storage circuit 102 on the non-illustrated operation screen. The information displayed herein is a series of information stored in the mail information storage circuit, such as the mail body, header information, a reception time, the results analyzed by the mail analysis circuit 104, and information indicating whether or not a mail is opened or read out by the hands-free function.

A description will be given of the process of setting privacy protection function start/stop switching. In step S501, switching is set according to an input by the portable telephone terminal user such that the privacy protection function being stopped is started or the privacy protection function being already in operation is stopped.

By this setting of switching, in the state where the privacy protection function is started and operating and further the portable telephone terminal 100 is set to allow operation of hands-free speech, the privacy protection function operates to prevent mail reading-out in the hands-free speech operation according to the setting.

In the following description, the case where switching is made so that the privacy protection function is started and operating will be given as a privacy function valid state and the opposite case as an invalid state. Although a place to store privacy function valid/invalid setting information is not shown in the functional block diagram, it may be held in a place where it can be properly read when the privacy protection function operates, for example, in a predetermined memory.

Next, operations upon mail reception will be described using a flow diagram of FIG. 3. This flow diagram shows the operations upon arrival of a mail in the state where the portable telephone terminal 100 is set so as to operate with the hands-free speech function.

When a mail arrives in step S601, mail data is then received by the mail processing circuit 109 (step S602).

Then, in mail analysis step S603, the message analysis circuit 104 analyzes the mail data and outputs analysis results for judgment in subsequent-stage privacy protection necessary/unnecessary judging step S604.

In message analysis circuit step S603, it is first confirmed based on information in step S620 whether the privacy protection function is either in a valid setting state or in an invalid setting state.

If the privacy protection function is invalid, the message analysis circuit 104 always outputs analysis result information indicative of the privacy protection being unnecessary regardless of the content of the mail data.

Figure 3:
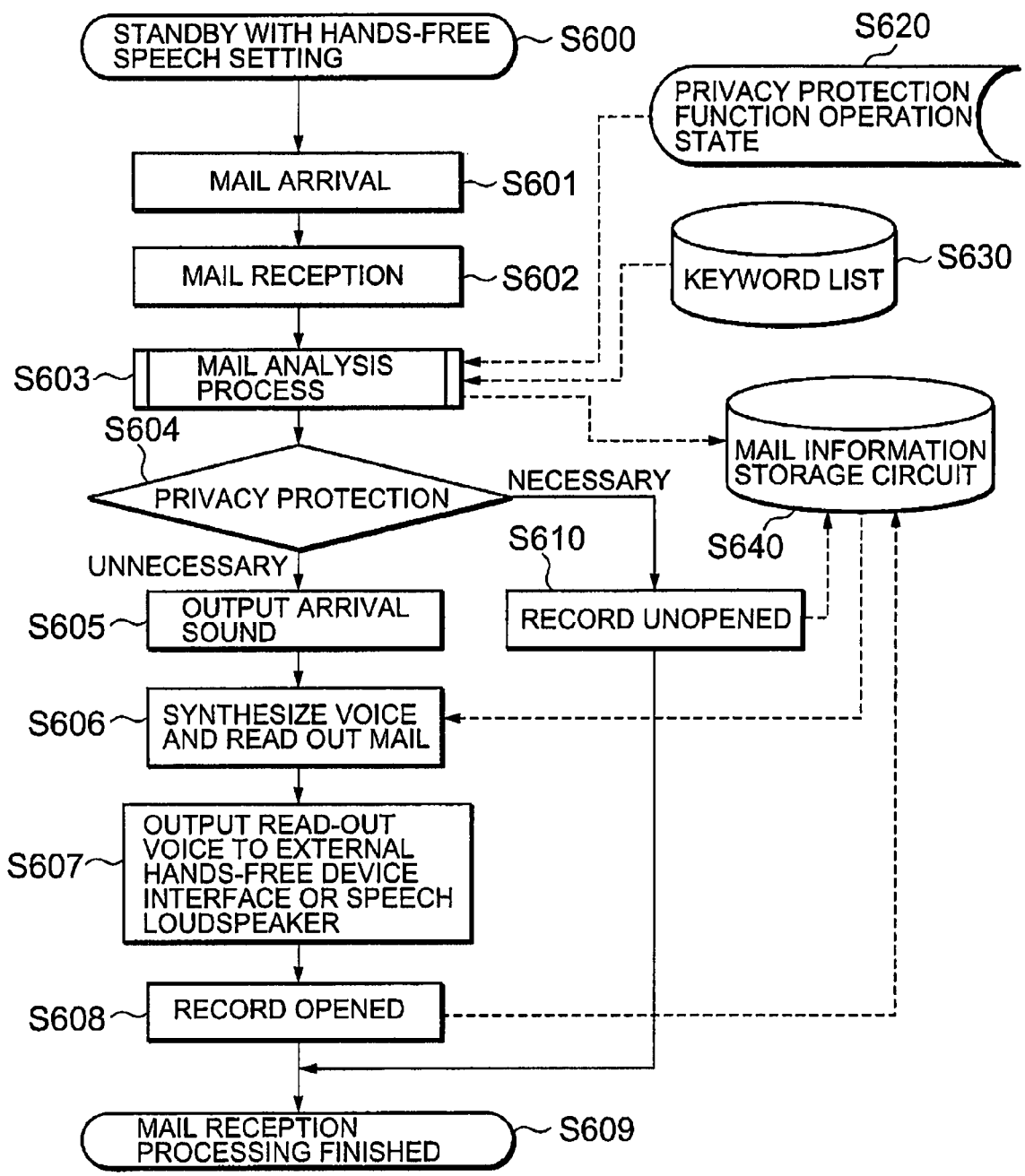
FIG. 3 is a flow diagram showing operations upon mail reception in the exemplary embodiment of this invention.

If the privacy protection function is valid, the mail analysis circuit 104 reads, in mail analysis process step S603, analysis information composed of keywords with valid/invalid information of attribute information being set valid and the attribute information thereof from the keyword list 110 (S630 in FIG. 3). The mail analysis circuit 104 receives the mail data from the mail processing circuit 109 and analyzes the mail data with respect to the respective analysis information read at the previous stage.

If the mail analysis according to the analysis information is established, for example, if a keyword, for which an attribute information logical condition is set true when including this keyword, is detected in a range of the mail data designated by analysis range information of attribute information, the mail analysis circuit 104 outputs the results indicative of the privacy protection being necessary to subsequent-stage privacy protection necessary/unnecessary judging step S604. Simultaneously with this, in step S603, the mail analysis circuit 104 stores the mail data, the mail analysis results, and other information such as a reception time of the mail and so on into the mail information storage circuit 102.

Based on the privacy protection necessary/unnecessary judgment in previous-stage mail analysis process step S603, the output content from the mail analysis circuit 104 to the hands-free function control circuit 105 and the arrival sound output circuit 106 is switched and, as a result, subsequent processes are bifurcated in privacy protection judging step S604.

If the analysis in the mail analysis circuit 104 results in that the analysis of one or more analysis information is established and thus the privacy protection is necessary, the output from the mail analysis circuit 104 to the hands-free function control circuit 105 and the arrival sound output circuit 106 is a signal indicative of preventing the hands-free operation. Based on the signal from the mail analysis circuit 104, the hands-free function control circuit 105 prevents reading-out of the mail and, simultaneously, the arrival sound output circuit 106 prevents output of an arrival sound. Further, the mail analysis circuit 104 records information indicative of the mail being unopened in the mail storage circuit S640 (step S610). As a result, depending on the setting conditions by the portable telephone terminal user, not only the content of the mail is not read in a voice, but also even the arrival sound upon mail arrival is not issued. Therefore, any sounds indicating the presence of the mail do not leak out around the portable telephone terminal and thus the privacy protection is realized. Herein, the arrival sound and the mail reading-out are controlled in the same manner. However, the arrival sound and the mail reading-out may be controlled differently by setting valid/invalid conditions of keywords so as to control them individually.

If the analysis in the mail analysis circuit 104 results in that the analysis of even one analysis information is not established and thus the privacy protection is unnecessary, the output from the mail analysis circuit 104 to the hands-free function control circuit 105 and the arrival sound output circuit 106 is a signal indicative of performing the hands-free operation. Based on the signal from the mail analysis circuit 104, the arrival sound output circuit 106 outputs the arrival sound for notifying the arrival. Further, based on the signal from the mail analysis circuit 104, the hands-free function control circuit 105 controls the voice synthesis circuit 103 to read out the mail. The voice synthesis circuit 103 reads the mail data of the mail from the mail information storage circuit and synthesizes a mail read-out voice (step 606), and outputs a produced voice signal to the external hands-free device interface 200 or the speech loudspeaker 107b of the speech circuit 107 (S607 and 107c). A selection is made according to the setting state of the portable telephone terminal 100 as to whether to use the external hands-free device 300 by outputting to the external hands-free interface 200 or whether to output through the speech loudspeaker 107b provided in the portable telephone terminal 100.

Finally, the mail analysis circuit 104 stores into the mail information storage circuit 102 information indicating that the received mail has been read out by the hands-free function and thus opened (S608).

Second Exemplary Embodiment

Figure 4:
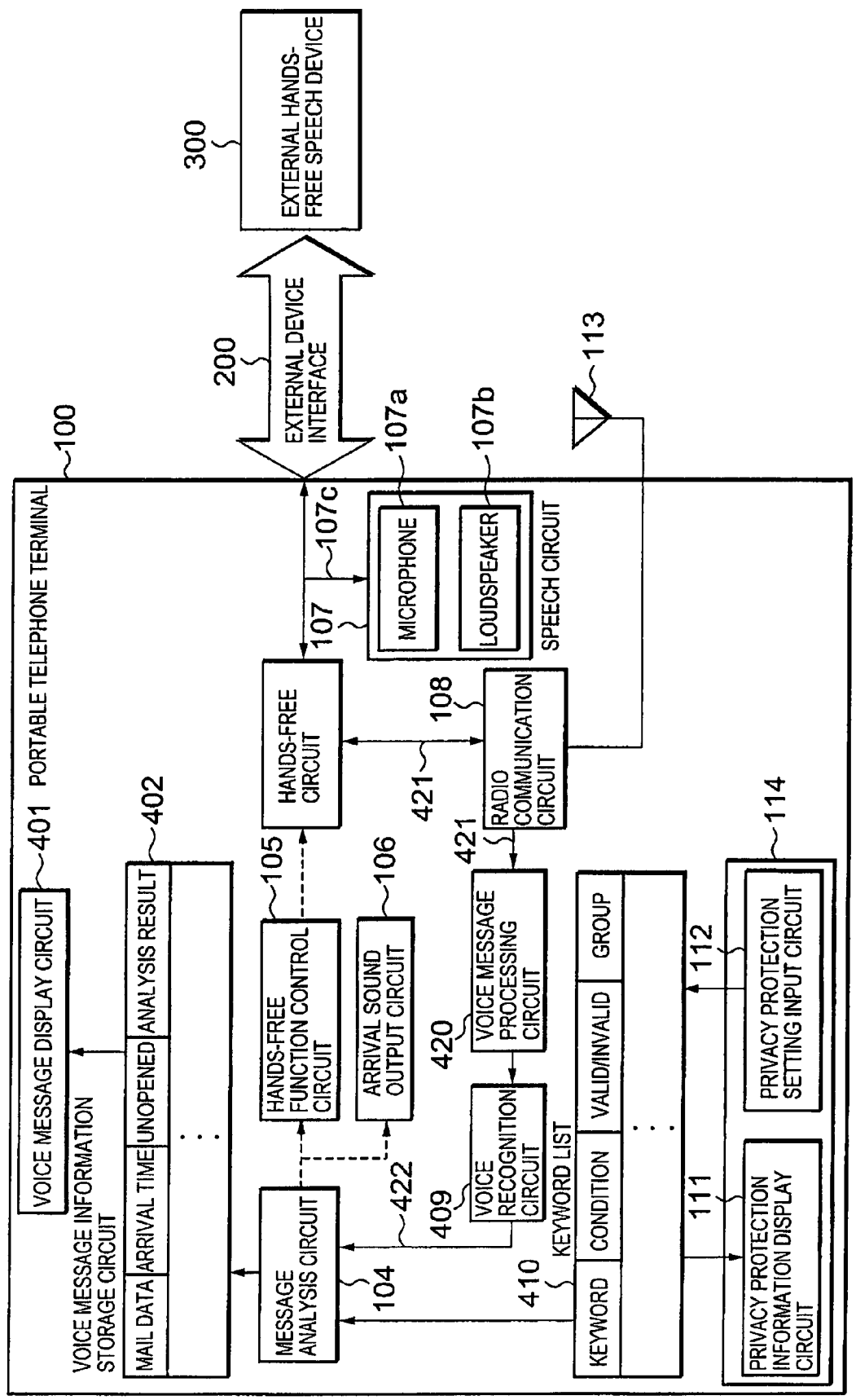
FIG. 4 is a structural diagram in a second exemplary embodiment of this invention.

The second exemplary embodiment will be described using FIG. 4. In the following description, a redundant description will be omitted of portions with the same contents as those in the first exemplary embodiment and a description will be given focusing on portions different from those in the first exemplary embodiment.

In the second exemplary embodiment, a voice message is an object of which the content is analyzed for judging whether the hands-free function is usable.

In the second exemplary embodiment, there are provided a voice message processing circuit 420 adapted to deal with a series of functions for a voice message, such as accumulation, storage, and calling of the voice message, and a voice recognition circuit 409 adapted to recognize the voice message and output it as character language information 422 to a message analysis circuit.

When a voice message process is input to a portable telephone terminal 100, the voice message is stored by the voice message processing circuit 420. In the state where the hands-free function is not set, voice messages received/input and stored in the portable telephone terminal are called out according to operations of a user and reproduced one by one. In the case where the hands-free function is set and operating, the voice message processing circuit outputs the voice message as a voice signal to the voice recognition circuit 409. The voice recognition circuit 409 recognizes the input voice signal and outputs it as character language information to the message analysis circuit 104. In completely the same manner as in the case of the first exemplary embodiment, the message analysis circuit 104 analyzes the voice message, converted into the character information by the voice recognition circuit 409, as to whether or not a specific keyword or word is included in the content of the message, and judges whether or not the hands-free function is usable, thereby performing the control.

Also in the second exemplary embodiment, since the control is performed by judging whether or not a specific keyword is included in a message to thereby judge whether or not the hands-free function is usable, flexible privacy protection can be realized.

In the second exemplary embodiment, a voice message may be a stored message such as a message in the automatic answering telephone service. Alternatively, it may be configured such that a call having arrived is initially responded to so as to receive an automatic answering telephone message and the voice message processing circuit 420, the voice recognition circuit 409, and the message analysis circuit 104 are operated in real time for processing a voice from a caller. In this case, after the arrival, a caller's voice uttered as a message to the automatic answering telephone service is instantly analyzed by the message analysis circuit 104 and, the moment a condition set in advance along with a keyword list in a keyword list 410 is established in analyzed voice data, switching is made to hands-free speech. This enables a using method such that only when specific content was confirmed in a voice message, switching is made to direct speech by the hands-free function from the time of the confirmation, while, unless the specific content is confirmed, the voice message is accumulated from beginning to end as a message to a portable telephone terminal set to automatic answering.

Third Exemplary Embodiment

Figure 5:
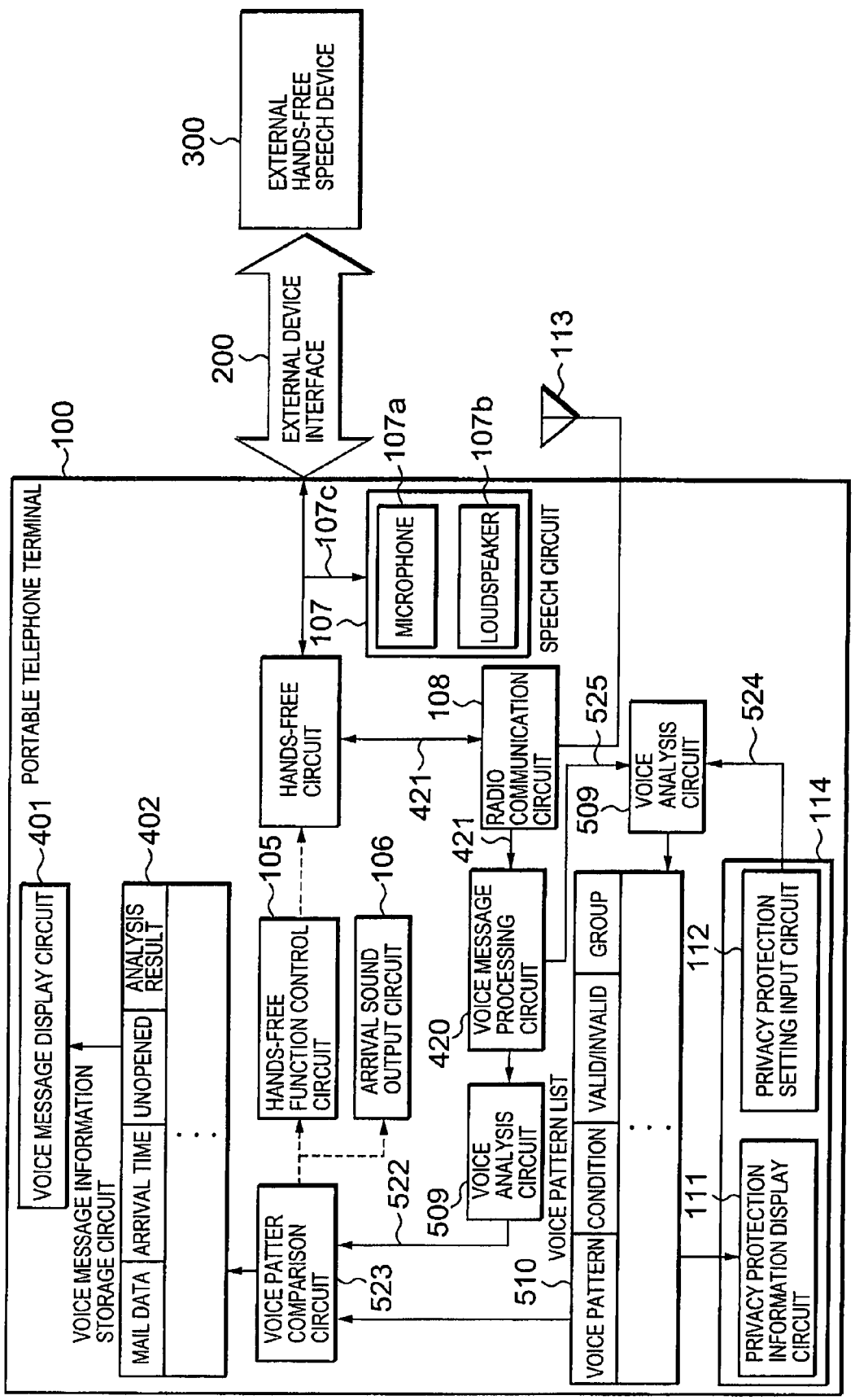
FIG. 5 is a structural diagram in a third exemplary embodiment of this invention.

The third exemplary embodiment will be described using FIG. 5. In the following description, a redundant description will be omitted of portions with the same contents as those in the first exemplary embodiment and a description will be given focusing on portions different from those in the first exemplary embodiment.

In the third exemplary embodiment, a voice message is an object for judging whether the hands-free function is usable.

In the third exemplary embodiment, there are provided a voice message processing circuit 420 like that in the second exemplary embodiment and a voice analysis circuit 509. Further, there is provided a voice pattern list 510 different from the keyword list 410 in the first or second exemplary embodiment. Further, there is provided a voice pattern comparison circuit 523 different from the message analysis circuit in the first or second exemplary embodiment.

In the third exemplary embodiment, the voice analysis circuit 509 analyzes a voice message output from the voice message processing circuit 420. The voice analysis circuit 509 analyzes a voice signal, extracts a feature of the voice signal, and outputs voice signal pattern information to the voice pattern comparison circuit 523. Herein, the voice signal pattern information is information indicative of a feature of a voice signal and represents, for example, voice spectrum information, voice pitch frequency, formant, or LPC parameter information corresponding to voiceprint information capable of identifying a speaker. The voice pattern list 510 holds, instead of keywords in the first or second exemplary embodiment, information like the voice signal pattern information output from the voice analysis circuit 509. Registration of a voice pattern into the voice pattern list 510 may be performed by using a voice message stored as a voice message (voice signal 525) or by newly inputting a voice to the portable telephone device (voice signal 524). In the voice pattern registration into the voice pattern list 510, a logical condition can be set per voice pattern to be registered like in the first or second exemplary embodiment. For example, setting may be performed based on a NOT condition so as to exclude a registered voice pattern. On the other hand, setting may be performed based on an OR condition for the case where any of voice patterns is included. Further, in the voice pattern registration into the voice pattern list 510, voice patterns to be registered may be grouped.

The voice signal pattern information output from the voice analysis circuit 509 and the voice pattern registered in the voice pattern list 510 are compared by the voice pattern comparison circuit 523, thereby judging whether or not use of the privacy protection function in hands-free speech is necessary.

Like in the second exemplary embodiment, a voice message to be an object in the third exemplary embodiment may be a stored message such as a message in the automatic answering telephone service or it may be configured such that a call having arrived is initially responded to so as to receive an automatic answering telephone message and the voice message processing circuit 420, the voice analysis circuit 509, and the voice pattern comparison circuit 523 are operated in real time for processing a voice from a caller. In this case, it is operated such that a response is made as the automatic answering telephone service immediately after the arrival and a caller's voice uttered as a message to the automatic answering telephone service is instantly analyzed and compared by the voice analysis circuit 509 and the voice pattern comparison circuit 523 to thereby judge agreement/disagreement with a voice set in advance as a voice pattern in the voice pattern list 510 and, the moment a judgment result is established in voice data according to a logical condition set for the voice pattern, switching is made to hands-free speech. This enables a using method such that, for example, only when specific content was confirmed in a voice message, switching is made to direct speech by the hands-free function from the time of the confirmation, while, unless the specific content is confirmed, the voice message is accumulated from beginning to end as a message to a portable telephone terminal set to automatic answering.

As described above, according to this invention, the high-level flexible control of the hands-free function depending on the content of arrived/received communication is enabled to prevent the hands-free function from operating inadvertently, thereby preventing leakage of information to others within reach of voice to whom the communication content should not be known, so that the object of this invention is accomplished.

INDUSTRIAL APPLICABILITY

As described above, a privacy protection device according to this invention is characterized by comprising, in addition to a message processing circuit, a message information storage circuit, and a voice circuit adapted to output a voice at a large volume at the time of using a hands-free function, a message analysis circuit and a keyword list for setting/holding words for use in message analysis. This enables flexible control of the hands-free function depending on the content of an arrived/received message, thereby realizing high-level privacy protection.

The invention claimed is:

1. A communication terminal comprising:
   a message communicator configured to communicate a message;
   a hands-free voice signal producer configured to produce a voice signal according to a received message received by said message communicator, said voice signal being output for hands-free speech through an external loudspeaker provided in said communication terminal or in a device used through a wired or wireless connection to said communication terminal, wherein the external loudspeaker is configured to output sound audible to those who are in vicinity of the external loudspeaker;
   an analysis information list storage circuit configured to store one or more analysis information for use in analyzing said received message in order to judge whether or not said received message is to be audible to said those who are in vicinity of the external loudspeaker;
   a message analysis circuit configured to perform a message analysis process for said received message according to said analysis information stored in said analysis information list storage circuit;
   a message storage circuit configured to store the message analyzed by the message analysis circuit;
   a message display circuit configured to display the message held in the message storage circuit; and
   a hands-free function control circuit configured to control said hands-free voice signal producer to not produce a voice signal in response to a determination that said received message complies with a condition designated in the one or more analysis information stored in the analysis information list storage circuit, wherein:
   when said message is an electronic mail, analysis range information about a range subjected to said message analysis by said message analysis circuit is further given to said analysis information by designating one or more elements of an electronic mail body and an electronic mail header, and
   said message analysis circuit is further configured to perform said message analysis aiming at a range according to said analysis range information.

2. The communication terminal claimed in claim 1, further comprising means for controlling a message arrival sound depending on said message analysis result.

3. The communication terminal according to claim 1, wherein:
   said analysis information includes a logical operation type logical condition; and
   said message analysis circuit performs the analysis process according to said logical condition.

4. The communication terminal according to claim 1, wherein at least one of said analysis information includes group information being attribute information indicating that said analysis information belongs to a predetermined group.

5. The communication terminal according to claim 1, wherein:
   at least one of said analysis information includes valid/invalid information being attribute information indicating whether or not to perform an analysis process using said analysis information; and
   said message analysis circuit switches whether or not to perform an analysis process per said analysis information depending on said valid/invalid information.

6. The communication terminal according to claim 1, further comprising means for displaying said analysis information stored by said analysis information list storage circuit.

7. The communication terminal according to claim 1, further comprising means for outputting the result of said message analysis process.

8. The communication terminal according to claim 1, wherein:
   when said message is an electronic mail,
   said analysis information is character string analysis information comprising one or more characters, and
   said message analysis circuit analyzes as to whether or not a character string of said character string analysis information is included in electronic mail data.

9. The communication terminal according to claim 1, wherein:
   when said message is a voice message,
   said analysis information is character string analysis information comprising one or more characters,
   said communication terminal further comprises a voice recognition circuit configured to convert said voice message into character language information, and
   said message analysis circuit analyzes whether or not a character string of said character string analysis information is included in said received voice message converted into character language information by said voice recognition circuit.

10. The communication terminal according to claim 9, further comprising means for performing voice call with another terminal, wherein:
    said voice message is transmitted via said voice call;
    said voice recognition circuit converts said speech voice into character language information and said message analysis circuit analyzes said speech voice converted into said character language information; and
    said hands-free control circuit controls operation and stop of the hands-free function depending on a result of said analysis.

11. The communication terminal according to claim 1, wherein:
when said message is a voice message,
said analysis information is voice signal pattern analysis information comprising voice signal pattern information including feature information of a voice signal,
a voice analysis circuit configured to extract a feature of a voice signal and output voice signal pattern information is further provided, and
said message analysis circuit compares between the voice signal pattern information of said analysis information list storage circuit and the voice signal pattern information of said voice message.

12. The communication terminal according to claim 11, further comprising means for performing voice call with another terminal, wherein:
said voice message is transmitted via said voice call;
said message analysis circuit analyzes said voice message; and
said hands-free control circuit controls operation and stop of said hands-free voice signal producer depending on a result of said analysis.

13. The communication terminal according to claim 11, further comprising a voice speech function, wherein:
said voice message is a speech voice that has arrived;
said message analysis circuit analyzes said speech voice; and
said hands-free control circuit controls operation and stop of the hands-free function depending on a result of said analysis.

14. A message voice output control method for controlling operation of voice-outputting a received message, received by a communication terminal through a communication line, through an external loudspeaker provided in said communication terminal or in another device connected to said communication terminal, the external loudspeaker being configured to output sound audible to those who are in vicinity of the external loudspeaker, comprising:
a step of storing one or more character string analysis information comprising character language information into an analysis information list storage circuit provided in said communication terminal in order to judge whether or not said received message is to be audible to said those who are in vicinity of the external loudspeaker;
a step of receiving a message by said communication terminal through the communication line;
a step of analyzing, by said communication terminal, whether or not the character string analysis information stored in said storage device is included in said message;
a step of storing the message analyzed into a message storage circuit provided in said communication terminal;
a step of displaying the message held in the message storage circuit; and
a step of controlling, by said communication terminal, output of said message through said external loudspeaker depending on a result of said analysis, wherein said message is not output as a voice signal in response to a determination that said message complies with a condition designated in the one or more character string analysis information stored in the analysis information list storage circuit, wherein
when said message is an electronic mail, analysis range information about a range subjected to said step of analyzing is further given to said character string analysis information by designating one or more elements of an electronic mail body and an electronic mail header, and said step of analyzing aims at a range according to said analysis range information.

15. The message voice output control method according to claim 14, wherein:
when said message is a voice message, the method further comprises:
a step of converting, by said communication terminal, said voice message into character language information through voice recognition is further included; and
said analyzing step analyzes said voice message converted into said character language information.

16. The message voice output control method according to claim 15, further comprising:
a step of storing the received voice message into voice message storage provided in said communication terminal;
wherein said converting step converts the voice message stored in said voice message storage into character language information.

17. The message voice output control method according to claim 15, wherein said converting step sequentially converts the received voice message into character language information.

18. The message voice output control method according to claim 14, wherein:
when said message is a voice message,
said storing step stores one or more voice signal analysis information comprising a voice signal pattern into said analysis information list storage circuit instead of the character analysis information or along with the character analysis information; and
said analyzing step compares between said voice signal pattern stored in said analysis information list storage circuit and said received voice message.

19. The message voice output control method according to claim 18,
further comprising a step of storing the received voice message into voice message storage provided in said communication terminal,
wherein said analyzing step compares between the voice message stored in said voice message storage and said voice signal pattern.

20. The message voice output control method according to claim 18, wherein said analyzing step sequentially compares between the received voice message and said voice signal pattern.

21. A non-transitory computer readable recording medium recording a computer program to be executed by a controller for controlling operation of a communication terminal, said computer program adapted to control operation of voice-outputting a received message, received by said communication terminal through a communication line, through an external loudspeaker provided in said communication terminal or in another device connected to said communication terminal, the external loudspeaker being configured to output sound audible to those who are in vicinity of the external loudspeaker, said computer program causing said controller to execute:
a step of storing one or more character string analysis information comprising character language information into an analysis information list storage circuit provided in said communication terminal in order to judge whether or not said received message is to be audible to said those who are in vicinity of the external loudspeaker;

a step of receiving a message by said communication terminal through the communication line;

a step of analyzing, by said communication terminal, whether or not the character string analysis information stored in said storage device is included in said message; and a step of storing the message analyzed into a message storage circuit provided in said communication terminal;

a step of displaying the message held in the message storage circuit; and a step of controlling, by said communication terminal, output of said message through said external loudspeaker depending on a result of said analysis, wherein said message is not output as a voice signal in response to a determination that said message complies with a condition designated in the one or more character string analysis information stored in the analysis information list storage circuit, wherein when said message is an electronic mail, analysis range information about a range subjected to said step of analyzing is further given to said character string analysis information by designating one or more elements of an electronic mail body and an electronic mail header, and said step of analyzing aims at a range according to said analysis range information.

\* \* \* \* \*